United States Patent
Yamamoto

(10) Patent No.: US 9,444,373 B2
(45) Date of Patent: Sep. 13, 2016

(54) MOTOR CONTROL DEVICE HAVING PROTECTIVE UNIT OF CHARGING RESISTOR

(71) Applicant: FANUC CORPORATION, Yamanashi (JP)

(72) Inventor: Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/731,557

(22) Filed: Jun. 5, 2015

(65) Prior Publication Data

US 2015/0365019 A1    Dec. 17, 2015

(30) Foreign Application Priority Data

Jun. 13, 2014   (JP) .................................. 2014-122868

(51) Int. Cl.
| | |
|---|---|
| *H02P 27/04* | (2016.01) |
| *H02P 1/02* | (2006.01) |
| *H02P 27/06* | (2006.01) |

(52) U.S. Cl.
CPC ............... *H02P 1/022* (2013.01); *H02P 27/06* (2013.01)

(58) Field of Classification Search
CPC ............ H02P 27/04; H02P 3/12; H02P 6/24; H02P 3/14
USPC ...... 318/3, 4, 7, 8, 650, 662, 35, 38, 71, 87, 318/98, 101, 114, 115, 119, 135, 148, 700, 318/400.01, 400.02, 400.14, 400.15, 318/400.21, 400.22, 714, 717, 727, 725, 318/757, 779, 799, 800, 801, 794, 795, 805, 318/808, 812, 244, 375, 376, 430, 432; 361/5, 6, 15, 21, 23, 93.9, 111; 363/40, 363/44, 55, 95
See application file for complete search history.

(56) References Cited

U.S. PATENT DOCUMENTS

| | | | |
|---|---|---|---|
| 6,900,606 B2 * | 5/2005 | Youm | H02P 3/12 318/362 |
| 8,446,747 B2 | 5/2013 | Cadoux | |

FOREIGN PATENT DOCUMENTS

| | | |
|---|---|---|
| JP | H02225279 A | 9/1990 |
| JP | H05064423 A | 3/1993 |

(Continued)

OTHER PUBLICATIONS

English translation of Abstract for Japanese Publication No. 2012120376, published Jun. 21, 2012, 1 page.

(Continued)

*Primary Examiner* — Antony M Paul
(74) *Attorney, Agent, or Firm* — Fredrikson & Byron, P.A.

(57) ABSTRACT

A motor control device includes a rectifier, a smoothing capacitor provided to a DC link, an inverter that power-converts DC power of the DC link and AC power of a motor side, an initial charging unit that charges the smoothing capacitor before motor driving start, a current detection unit that detects an AC current detection value of an input side of the rectifier, a current conversion unit that converts the detection value into a value corresponding to a DC link current, a current integration unit that outputs an integration value obtained by integrating the conversion value, an alarm output unit that outputs an alarm when the integration value is equal to or more than a first threshold value, a disconnecting unit that disconnects the AC power to the rectifier in response, and a protective unit that commands the disconnecting unit to disconnect the AC power when the alarm is output.

8 Claims, 6 Drawing Sheets

(56) References Cited

FOREIGN PATENT DOCUMENTS

| JP | H07023523 A | 1/1995 |
|----|-------------|--------|
| JP | H11341820 A | 12/1999 |
| JP | 2000152643 A | 5/2000 |
| JP | 2012120376 A | 6/2012 |
| JP | 2013205257 A | 10/2013 |

OTHER PUBLICATIONS

English translation of Abstract for Japanese Publication No. H11341820, published Dec. 10, 1999, 1 page.
English translation of Abstract for Japanese Publication No. H07023523, published Jan. 24, 1995, 1 page.
English translation of Abstract for Japanese Publication No. H05064423, published Mar. 12, 1993, 1 page.
English translation of Abstract for Japanese Publication No. H02225279, published Sep. 7, 1990, 1 page.
Translated Decision to Grant a Patent for Japanese Application No. 2014-122868, Date of Mailing: Sep. 8, 2015, 3 pages.
Untranslated Decision to Grant a Patent for Japanese Application No. 2014-122868, Date of Mailing: Sep. 8, 2015, 3 pages.
English Abstract for Japanese Publication No. 2000-152643 published May 30, 2000, 2 pgs.
English Abstract for Japanese Publication No. 2013-205257 published Oct. 7, 2013, 1 pg.

* cited by examiner

CURRENT VECTOR
ON THREE-PHASE
COORDINATE

THREE-PHASE
TO TWO-PHASE
CONVERSION

CURRENT VECTOR
ON TWO-PHASE
COORDINATE

MOTOR CONTROL DEVICE HAVING PROTECTIVE UNIT OF CHARGING RESISTOR

BACKGROUND OF THE INVENTION

1. Field of the Invention

The present invention relates to a motor control device that converts AC power supplied from a three-phase AC power supply into DC power, outputs the DC power to a DC link, further converts the DC power into AC power for the driving of a motor, and supplies the AC power to the motor, and, specifically, to a motor control device having a protective unit of a charging resistor used for the charging of a smoothing capacitor provided to a DC link.

2. Description of the Related Art

In a motor control device that drives a motor in a machine tool, a press-forging machine, an injection molding machine, an industrial machine, or various robots, AC power input from an AC power supply side is converted into DC power once, the DC power is further converted into AC power, and this AC power is used as driving power of motors provided for each driving axis.

FIG. 7 is a diagram illustrating the configuration of a general motor control device. A motor control device 100 includes a rectifier 11 that rectifies AC power from a three-phase AC input power supply 3 and outputs DC power, and inverters 12 that are connected to a DC link, which is a DC side of the rectifier 11, and convert the DC power output from the rectifier 11 into AC power with a desired voltage and a desired frequency to be supplied as driving power of motors 2 or convert AC power regenerated from the motors 2 into DC power, and controls the speed and torque of the motors 2 connected to AC sides of the inverters 12 or the position of a rotator. In addition, in FIG. 7, an AC reactor of a three-phase AC input side of the rectifier 11 is indicated by L.

The inverters 12 having the same number as that of the motors 2 respectively provided corresponding to a plurality of driving axes are connected in parallel to individually supply driving power to each motor 2 and to drive and control each motor 2. Smoothing capacitors 32 are respectively provided to DC input sides of the inverters 12. In addition, in FIG. 7, since the number of motors 2 is 1 for simplification, the number of inverters 12 is one. On the other hand, one rectifier 11 is provided to a plurality of inverters 12 for the purpose of reducing the cost and space occupied by the motor control device 100 in many cases.

The smoothing capacitor 32 needs to be charged until the driving of the motor 2 is started (i.e., a power conversion operation is started by the inverter 12) immediately after the motor control device 100 starts to operate. Hereinafter, the charging of the smoothing capacitor 32 before the driving of the motor 2 is started will be referred to "initial charging". In the state in which no energy has been accumulated in the smoothing capacitor 32 at the time of the start of the initial charging, a large inrush current flows through the rectifier 11. Specifically, as the capacity of the smoothing capacitor 32 is large, a larger inrush current is generated. As a countermeasure of the inrush current, it is general to provide an initial charging unit 13 between the rectifier 11 and the smoothing capacitor 32, or to the three-phase AC input side of the rectifier 11. The example illustrated in FIG. 7 illustrates the case in which the initial charging unit 13 is provided between the rectifier 11 and the smoothing capacitor 32. Although not illustrated in the drawing, for example, in the case in which a plurality of inverters 12 are connected in parallel, the inverters 12 have a parallel connection relation for the smoothing capacitor 32 in response to the case. However, the case in which the initial charging unit 13 is provided between the rectifier 11 and the smoothing capacitor 32, one initial charging unit 13 is provided between the rectifier 11 and these smoothing capacitors 32. Furthermore, for example, although not illustrated in the drawing, when the initial charging unit 13 is provided to the three-phase AC input side of the rectifier 11, the initial charging unit 13 is provided to at least two phases of the three phases of the three-phase AC input side of the rectifier 11, regardless of the number of connected inverters 12.

The initial charging unit 13 has a switch unit 33 and a charging resistor 31 connected in parallel to the switch unit 33. The switch unit 33 is opened (turned off) only during an initial charging period of the smoothing capacitor 32 immediately after the motor control device 100 starts to operate, and maintains a closed circuit state (a turn-on state) during a typical operation period in which the motor control device 100 drives the motor 2. In more detail, the switch unit 33 is opened (turned off) during the initial charging period until the driving of the motor 2 is started immediately after the motor control device 100 starts to operate, so that the DC power output from the rectifier 11 flows into the smoothing capacitor 32 through the charging resistor 31 and thus the smoothing capacitor 32 is charged. When the smoothing capacitor 32 is charged up to a predetermined voltage, the switch unit 33 is closed (turned on), so that the initial charging operation is completed. Thereafter, the inverter 12 starts a power conversion operation to supply the motor 2 with driving power, so that the motor 2 is driven on the basis of the driving power.

As described above, during the initial charging period of the smoothing capacitor 32, since the switch unit 33 is opened (turned off), the DC power output from the rectifier 11 flows through the charging resistor 31 and is consumed in the charging resistor 31 as heat to a certain degree, so that the generation of an excessive inrush current is suppressed during the initial charging period. However, when heat is excessively generated by a current flowing through the charging resistor 31, the charging resistor 31 is fused. In general, the charging resistor 31 has instantaneous load tolerance (hereinafter, simply referred to as "tolerance") defined as heat capacity tolerable against fusing. When a DC current generating heat capacity equal to or more than the instantaneous load tolerance continuously flows through the charging resistor 31, the charging resistor 31 is fused.

Since the DC current flowing through the charging resistor 31 during the initial charging period depends on the capacity of the smoothing capacitor 32, and heat capacity generated in the charging resistor 31 depends on the DC current flowing through the charging resistor 31, the maximum capacity of the smoothing capacitor 32 installable in the motor control device 100 is decided in response to the tolerance of the charging resistor 31. At the time of design of the motor control device 100, a designer typically selects the smoothing capacitor 32 in a range in which the maximum capacity is not exceeded in consideration of the relationship between the tolerance of the charging resistor 31 and the maximum capacity of the smoothing capacitor installable under the tolerance.

When a designer erroneously selects a smoothing capacitor 32 having a capacity not satisfying the aforementioned design condition (i.e., a smoothing capacitor 32 having a capacity exceeding the maximum capacity of the smoothing capacitor 32 decided in response to the tolerance of the charging resistor 31), a DC current equal to or more than the tolerance flows through the charging resistor 31, resulting in the occurrence of the abnormality of an initial charging unit such as fusing of the charging resistor 31. For example, when a designer designs the motor control device 100 provided with a plurality of inverters 12 for the purpose of driving a plurality of motors 2 or when the smoothing capacitor 32 is exchanged into a smoothing capacitor having a large capacity or a new smoothing capacitor 32 is added in maintenance later and the like, the total capacity of the capacities of a plurality of smoothing capacitors 32 exceeds the maximum capacity of the smoothing capacitor 32 decided in response to the tolerance of the charging resistor 31 (hereinafter, such a state will be simply referred to "excess in the capacity of the smoothing capacitor 32").

Furthermore, even though the motor control device 100 satisfying the aforementioned design condition is provided, for example, when the DC link is short-circuited by failure of a switching element and the like of the rectifier 11 or the inverter 12, a DC current equal to or more than the tolerance flows through the charging resistor 31 during the initial charging period, resulting in the occurrence of the abnormality of the initial charging unit such as fusing of the charging resistor 31.

As described above, as a main factor causing a DC current equal to or more than the tolerance to flow through the charging resistor 31, there are excess in the capacity of the smoothing capacitor 32, and short-circuit of the DC link by failure of the switching element and the like of the rectifier 11 or the inverter 12. Hereinafter, the case in which the initial charging unit 13 is provided between the rectifier 11 and the smoothing capacitor 32 will be described. However, even in the case in which the initial charging unit 13 is provided to the three-phase AC input side of the rectifier 11, a problem such as fusing of the charging resistor 31 occurs in a similar manner.

As disclosed in Japanese Unexamined Patent Publication No. 2000-152643, as a conventional art for detecting the abnormality of an initial charging unit, there is a technology in which when a value obtained by temporally integrating an output current of the initial charging unit is compared with a value obtained by multiplying the capacity of a capacitor connected to both ends of a DC side of an inverter by the voltage of the capacitor and a difference equal to or more than a predetermined setting value exists between these two values, it is determined that there is abnormality in the initial charging unit and a charging operation circuit is disconnected.

Furthermore, as disclosed in Japanese Unexamined Patent Publication No. 2013-205257, there is a technology in which the capacity of a capacitor connected in parallel on the input side of a load and a time constant specified from a resistance value of a precharge circuit are detected from voltage rise characteristics of a precharged capacitor, and the abnormality of the precharge circuit or the capacitor is determined on the basis of the detected time constant.

According to the aforementioned conventional arts, it is possible to detect the abnormality of the initial charging unit, which is caused by the short-circuit of the DC link by failure of the switching element and the like of the rectifier 11 or the inverter 12, but there is a problem that it is not possible to detect the abnormality of the initial charging unit, which is caused by excess capacity of the smoothing capacitor 32. As described above, when a designer designs the motor control device 100 provided with a plurality of inverters 12 for the purpose of driving a plurality of motors 2 or when the smoothing capacitor 32 is changed into a smoothing capacitor having a large capacity or a new smoothing capacitor 32 is added in maintenance later and the like, the total capacity of the capacities of a plurality of smoothing capacitors 32 may exceed the maximum capacity of the smoothing capacitor 32 decided in response to the tolerance of the charging resistor 31. Even though the smoothing capacitors 32 are connected in parallel or the smoothing capacitor 32 is exchanged into a smoothing capacitors having a different capacity, since there is no change in a DC voltage value of both ends of the smoothing capacitor 32, it is not possible to detect the abnormality of the initial charging unit, which is caused by "excess capacity of the smoothing capacitor 32" in the aforementioned conventional arts. When it is not possible to detect the abnormality of the initial charging unit, it is not possible to appropriately protect the initial charging unit (specifically, the charging resistor).

SUMMARY OF THE INVENTION

Therefore, it is an object of the present invention to provide a motor control device capable of reliably protecting an initial charging unit used in the initial charging of a smoothing capacitor provided to a DC link.

In order to achieve the aforementioned object, a motor control device includes: a rectifier that rectifies AC power supplied from an three-phase AC input side and outputs DC power; a smoothing capacitor provided to a DC link which is a DC output side of the rectifier; an inverter that mutually power-converts DC power in the DC link and AC power which is driving power or regenerative power of a motor; an initial charging unit having a switch unit and a charging resistor connected in parallel to the switch unit, opening the switch unit before motor driving is started, and charging the smoothing capacitor with a DC current output from the rectifier via the charging resistor; a current detection unit that detects an AC current value of the three-phase AC input side of the rectifier, and outputs an AC current detection value; a current conversion unit that outputs a conversion value obtained by converting the AC current detection value into a value corresponding to a DC current in the DC link; a current integration unit that outputs an integration value obtained by integrating the conversion value output from the current conversion unit during a charging period of the smoothing capacitor by the initial charging unit; an alarm output unit that outputs an alarm when the integration value is equal to or more than a first threshold value; a disconnecting unit that is able to disconnect supply of the AC power to the rectifier in response to a received command; and a protective unit that commands the disconnecting unit to disconnect the supply of the AC power when the alarm is output.

The first threshold value is set as a value smaller than a charge amount by which the charging resistor is fused by the amount of charge flowing through the charging resistor.

Furthermore, the motor control device may further include: a voltage detection unit that detects a DC voltage value of the smoothing capacitor and outputs a DC voltage detection value; and a voltage rise value calculation unit that calculates a DC voltage rise value which is an increment of the DC voltage detection value from charging start of the smoothing capacitor by the initial charging unit. In this case, when the integration value is equal to or more than the first threshold value and the DC voltage rise value is smaller than a second threshold value, the alarm output unit outputs the alarm.

The second threshold value is set as a value smaller than a minimum value of the DC voltage rise value when the integration value has reached the first threshold value.

Furthermore, the motor control device may further include a factor determination unit that determines an alarm generation factor of the initial charging unit based on the DC voltage rise value when the alarm has been output.

Furthermore, in a case in which the DC voltage rise value when the alarm has been output is smaller than a third threshold value, the factor determination unit determines that the alarm generation factor is short-circuit of the DC link, and in a case in which the DC voltage rise value is equal to more than the third threshold value, the factor determination unit determines that the alarm generation factor is excess in a capacity of the smoothing capacitor provided to the DC link.

The third threshold value is set as a value smaller than the second threshold value in response to a detection error of the voltage detection unit.

The current conversion unit calculates, as the conversion value, a vector norm on a two-phase coordinate obtained by performing three-phase to two-phase conversion of the AC current detection value, or a peak current value of the AC current detection value.

BRIEF DESCRIPTION OF DRAWINGS

The present invention will understood more clearly with reference to the following appended drawings, in which.

DETAILED DESCRIPTION

Figure 1:
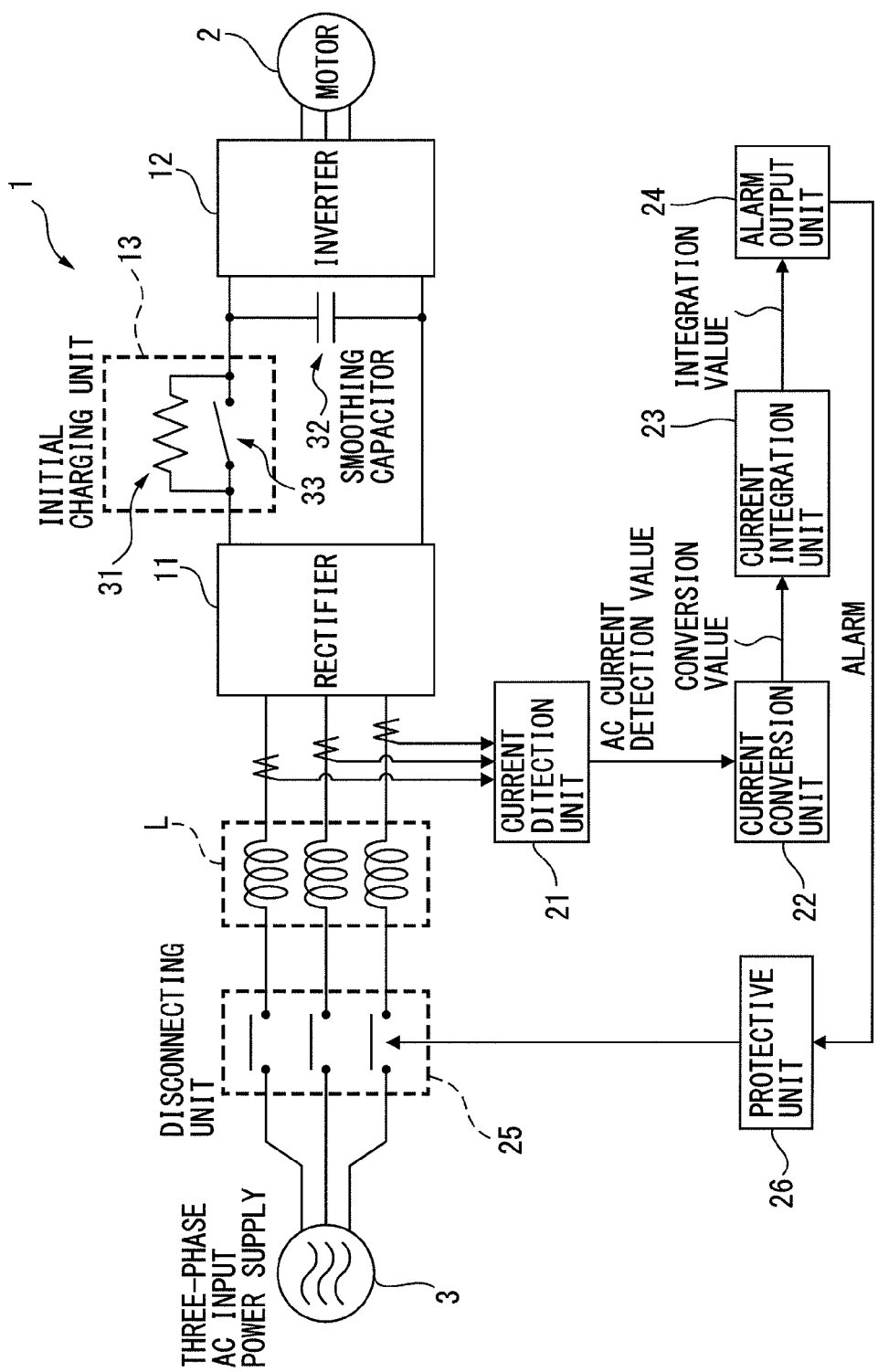
FIG. 1 is a principal block diagram of a motor control device according to a first embodiment.

In the following, by referring to the drawings, a motor control device having a protective unit of a charging resistor will be described. However, it is to be understood that the present invention is not limited to the drawings or embodiments illustrated below.

FIG. 1 is a principal block diagram of a motor control device according to a first embodiment. Hereinafter, it is assumed that elements with the same reference numerals in different drawings indicate elements having the same function.

In addition, in the first to third embodiments, a three-phase AC input power supply 3 is connected to a three-phase AC input side of a motor control device 1, and a three-phase motor 2 is connected to an AC motor side of the motor control device 1. In addition, even in the first to third embodiments, the motor control device 1 that drives and controls one motor 2 will be described. However, the number of motors 2 to be driven and controlled does not specifically limit the present invention, and the present invention can also be applied to a motor control device that drives and controls a plurality of motors 2. Furthermore, the type of the motor 2 driven by the motor control device also does not specifically limit the present invention, and for example, the present invention can also be applied to an induction motor and a synchronous motor.

According to the first embodiment, the motor control device 1 includes a rectifier 11, an inverter 12, a smoothing capacitor 32, an initial charging unit 13, a current detection unit 21, a current conversion unit 22, a current integration unit 23, an alarm output unit 24, a disconnecting unit 25, and a protective unit 26.

The rectifier 11 rectifies AC power supplied from a three-phase AC input side of a commercial three-phase AC input power supply 3, and outputs DC power to a DC link which is a DC output side of the rectifier 11. In the present invention, an embodiment of the rectifier to be used is not specifically limited, and for example, there are a three-phase full wave rectifying circuit having a 120° conduction regeneration function, a rectifying circuit of a PWM control scheme, and the like. An AC reactor L is connected to a three-phase AC input side of the rectifier 11.

The inverter 12 mutually power-converts DC power in the DC link and AC power which is driving power or regenerative power of the motor 2. The inverter 12, for example, is configured as a conversion circuit having a switching element therein such as a PWM inverter. The inverter 12 allows the internal switching element to perform a switching operation so as to convert DC power supplied from a DC link side into three-phase AC power with a desired voltage and a desired frequency for driving the motor 2 on the basis of a motor driving command received from an upper control device (not illustrated). The motor 2 operates on the basis of the supplied voltage-variable and frequency-variable three-phase AC power. Furthermore, at the time of braking of the motor 2, regenerative power is generated. However, on the basis of the motor driving command received from the upper control device, AC power, which is the regenerative power generated in the motor 2, is converted into DC power and is returned to the DC link. In addition, when the motor control device 1 drives and controls a plurality of motors 2, a plurality of inverters 12 having the same number as that of the motors 2 are connected in parallel in order to individually supply the motors 2 with driving power and drive and control the motors 2.

The rectifier 11 is provided at the three-phase AC input side thereof with the disconnecting unit 25 capable of disconnecting the supply of the AC power to the rectifier 11 in response to a received command. The disconnecting unit 25 is generally provided to an input stage of the motor control device 1 in order to protect the rectifier 11 and the inverter 12 of the motor control device 1 in an emergency, and for example, opens an open/close switch (not illustrated) of the disconnecting unit 25 and disconnects the supply of the AC power to the rectifier 11 when a disconnecting command is received from the upper control device (not illustrated). Furthermore, in the first embodiment, even when a disconnecting command is received from the protective unit 26 as will be described later, the disconnecting unit 25 opens the open/close switch (not illustrated) of the disconnecting unit 25 and disconnects the supply of the AC power to the rectifier 11.

The smoothing capacitor 32 is provided to the DC link that connects the DC side of the rectifier 11 to the DC side of the inverter 12. The smoothing capacitor 32 has a function of suppressing a pulsation component of DC output of the rectifier 11 or the inverter 12, and also has a function of temporarily accumulating the DC power output from the rectifier 11 or the inverter 12.

In addition, FIG. 1 illustrates an example in which one inverter 12 is provided. However, when a plurality of inverters 12 are connected in parallel, the smoothing capacitor 32 is provided to a DC input side of each inverter 12, and thus the inverters 12 have a parallel connection relation for the smoothing capacitors 32.

The initial charging unit 13 is for charging the smoothing capacitor 32 with a DC current output from the rectifier 11 until the motor control device 1 actually starts motor driving control after starting to operate, and is provided between the rectifier 11 and the smoothing capacitor 32 in the first embodiment. Alternatively, the initial charging unit 13 may be provided to the three-phase AC input side of the rectifier 11 as will be described above. Furthermore, FIG. 1 illustrates an example in which one inverter 12 is provided. However, when a plurality of inverters 12 are connected in parallel, since the inverters 12 have a parallel connection relationship for the smoothing capacitors 32, one initial charging unit 13 is provided between the rectifier 11 and these smoothing capacitors 32.

The initial charging unit 13 has a switch unit 33 and a charging resistor 31 connected in parallel to the switch unit 33. The switch unit 33, for example, is configured by a mechanical switch, or a semiconductor switching element such as IGBT and a thyristor.

The switch unit 33 is opened (turned off) only during an initial charging period of the smoothing capacitor 32 immediately after the motor control device 1 starts to operate, and maintains a closed circuit state (a turn-on state) during a typical operation period in which the motor control device 1 drives the motor 2. In more detail, the switch unit 33 is opened (turned off) during the initial charging period until the driving of the motor 2 is started immediately after the motor control device 1 starts to operate, so that the DC current output from the rectifier 11 flows into the smoothing capacitor 32 through the charging resistor 31 and thus the smoothing capacitor 32 is charged. When the smoothing capacitor 32 is charged up to a predetermined voltage, the switch unit 33 is closed (turned on), so that the initial charging operation is completed. After the initial charging operation is completed, the inverter 12 starts a power conversion operation to supply the motor 2 with driving power, so that the motor 2 is driven on the basis of the driving power.

The current detection unit 21 detects an AC current value of the three-phase AC input side of the rectifier 11 and outputs an AC current detection value. In order to detect the AC current value used in the driving control of the motor 2 by the motor control device 1, the current detection unit 21 is generally provided in the motor control device 1. However, in the first embodiment, the AC current detection value output by the current detection unit 21 is also sent to the current conversion unit 22.

The current conversion unit 22 converts the AC current detection value into a value corresponding to a DC current in the DC link, and outputs the value. Hereinafter, the value output by the current conversion unit 22 will be simply referred to as a "conversion value". The conversion value output by the current conversion unit 22 is sent to the current integration unit 23.

Figure 2:
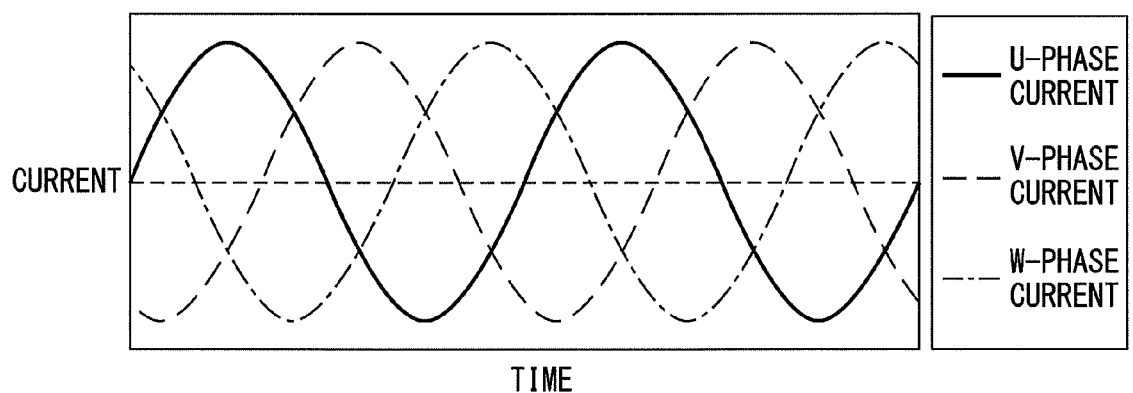
FIG. 2 is a diagram illustrating a three-phase AC current.
Figure 3A:
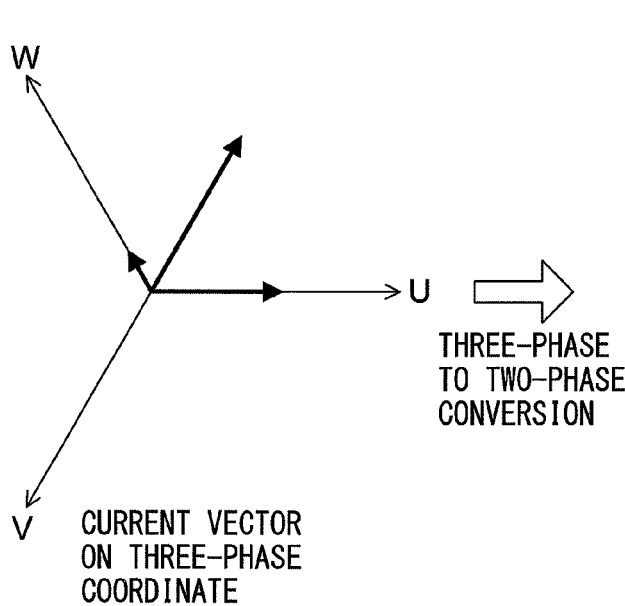
FIG. 3A and FIG. 3B are diagrams for explaining three-phase to two-phase conversion.
Figure 3B:
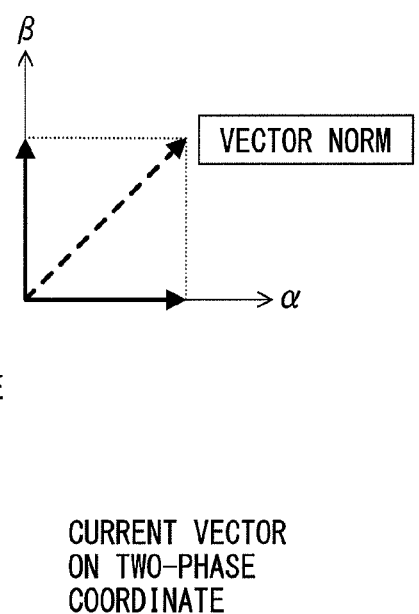

The current conversion unit 22, for example, calculates a vector norm on a two-phase coordinate obtained by performing three-phase to two-phase conversion of the AC current detection value, and outputs the vector norm as the conversion value. FIG. 2 is a diagram illustrating a three-phase AC current and FIG. 3A is a diagram for explaining the three-phase to two-phase conversion. The three-phase UVW AC current as illustrated in FIG. 2 is represented by a current vector as illustrated in FIG. 3A on a three-phase coordinate. When the current vector on the three-phase coordinate is subjected to the three-phase to two-phase conversion, a current vector on the two-phase coordinate as illustrated in FIG. 3B is obtained and this vector norm is used as the aforementioned conversion value. In addition, in the illustrated example, αβ conversion is used as the three-phase to two-phase conversion; however, dq conversion may be used.

In the present first embodiment, the current conversion unit 22 calculates the vector norm as the conversion value. However, alternatively, a peak current value of the AC current detection value may be calculated and may be output as the conversion value.

The current integration unit 23 outputs a value obtained by integrating the conversion value output from the current conversion unit 22 during the charging period of the smoothing capacitor 32 by the initial charging unit 13. Hereinafter, the value output by the current integration unit 23 will be simply referred to as an "integration value". The integration value output by the current integration unit 23 is sent to the alarm output unit 24.

In detail, the aforementioned "integration value" is obtained by integrating the conversion value output from the current conversion unit 22 during the initial charging period "from the start time point of the motor control device 1 to the charging completion time point of the smoothing capacitor 32", and a unit of the integration value is "Q (coulomb)" which is a unit of charge. Since the inverter 12 does not perform the power conversion operation during the initial charging period, the DC current output from the rectifier 11 flows into and is accumulated in the smoothing capacitor 32 while being limited by the charging resistor 31. Accordingly, the aforementioned "integration value" output by the current integration unit 23 may be regarded as corresponding to "the amount of charge flown into the smoothing capacitor 32 by passing through the charging resistor 31".

The alarm output unit 24 determines whether the integration value received from the current integration unit 23 is equal to or more than a first threshold value, and outputs an alarm when the integration value is equal to or more than the first threshold value.

Hereinafter, the setting of the first threshold value used in an alarm output process in the alarm output unit 24 will be described. As described above, since the DC current flowing through the charging resistor 31 during the initial charging period depends on the capacity of the smoothing capacitor 32, and heat capacity generated in the charging resistor 31 depends on the DC current flowing through the charging resistor 31, the maximum capacity of the smoothing capacitor 32 installable in the motor control device 1 is decided in response to the tolerance of the charging resistor 31. The instantaneous load tolerance $J_{MAX}$ [J] of the charging resistor 31 (R[Ω]) is expressed by Equation 1 below when the maximum capacity of the smoothing capacitor 32 installable in the motor control device 1 is set to $C_{MAX}$ [F] and a peak value of an upper limit value of a specification of an AC voltage applied to the three-phase AC input side of the rectifier 11 is set to $V_{MAX}$ [V].

$$J_{MAX} = \frac{1}{2} C_{MAX} \cdot V_{MAX}^2 \qquad (1)$$

In the case in which the DC link is short-circuited by failure of the switching element and the like of the rectifier 11 or the inverter 12 during the initial charging period, when a time until the charging resistor 31 having the instantaneous load tolerance $J_{MAX}$ [J] is fused is set to $T_{SHT}$ [second] and the resistance value of the charging resistor 31 is set to R [Ω], the following Equation 2 is established.

$$J_{MAX} = \frac{V_{MAX}^2}{R} T_{SHT} \qquad (2)$$

When Equation 2 is put into Equation 1, the following Equation 3 representing the time $T_{SHT}$ until the charging resistor 31 is fused is obtained.

$$T_{SHT} = \frac{R \cdot C_{MAX}}{2} \qquad (3)$$

A current $I_{SHT}$ [A] flowing through the charging resistor 31 when the DC link is short-circuited is expressed by Equation 4 below.

$$I_{SHT} = \frac{V_{MAX}}{R} \qquad (4)$$

Thus, when the DC link is short-circuited, a charge amount $Q_{SHT}$ [C] flown into the smoothing capacitor 32 until the charging resistor 31 is fused is expressed by Equation 5 below using Equation 3 and Equation 4 above.

$$\begin{aligned} Q_{SHT} &= I_{SHT} \cdot T_{SHT} \qquad (5) \\ &= \frac{V_{MAX}}{R} \cdot \frac{R \cdot C_{MAX}}{2} \\ &= \frac{C_{MAX}}{2} \cdot V_{MAX} \end{aligned}$$

The charge amount $Q_{SHT}$ [C] expressed by Equation 5 above indicates a "corresponding charge amount by which the charging resistor 31 is fused by the amount of charge flowing through the charging resistor 31". Therefore, in the first embodiment, in order to prevent the charging resistor 31 from being fused by the DC current flowing through the charging resistor 31 during the initial charging period from the start time point of the motor control device 1 to the charging completion time point of the smoothing capacitor 32, the first threshold value $Th_1$ is set to be lower than the "charge amount $Q_{SHT}$ [C] by which the charging resistor 31 is fused by the amount of charge flowing through the charging resistor 31" as expressed by Equation 6 below, and is used as a determination condition for determining the presence or absence of the probability that the charging resistor 31 is fused.

$$Th_1 < Q_{SHT} = \frac{C_{MAX}}{2} \cdot V_{MAX} \qquad (6)$$

When it is determined that the aforementioned integration value is equal to or more than the first threshold value $Th_1$, the alarm output unit 24 outputs an alarm because it is highly probable that the charging resistor 31 is fused, and otherwise, the alarm output unit 24 outputs no alarm.

The protective unit 26 outputs a disconnecting command of the supply of the AC power to the disconnecting unit 25 when the alarm is output from the alarm output unit 24. The disconnecting unit 25 having received the disconnecting command opens the internal open/close switch (not illustrated), thereby disconnecting the supply of the AC power to the rectifier 11. When the input the AC power is disconnected, no DC power is output from the rectifier 11 and thus no DC current flows through the initial charging unit 13, so that it is possible to protect the initial charging unit 13. As described above, as a main factor causing a DC current equal to or more than the tolerance to flow through the charging resistor 31, there are excess in the capacity of the smoothing capacitor 32, and short-circuit of the DC link by failure of the switching element and the like of the rectifier 11 or the inverter 12. However, according to the first embodiment, since the value obtained by performing the aforementioned calculation process for the AC current detection value of the three-phase AC input side of the rectifier 11 is compared with the first threshold value $Th_1$ and it is detected that the charging resistor 31 is probably fused, it is not affected by the factor (i.e., the alarm generation factor) causing an excessive DC current to flow through the charging resistor 31, such as failure of the switching element and the like of the rectifier 11 or the inverter 12 or excess in the capacity of the smoothing capacitor 32. When an alarm indicating the probability of fusing of the charging resistor 31 is output, since the protective unit 26 outputs the disconnecting command of the supply of the AC power to the disconnecting unit 25 regardless of the content of the alarm generation factor, it is possible to prevent a DC current equal to or more than the tolerance from flowing through the charging resistor 31 and to reliably protect the initial charging unit.

Figure 4:
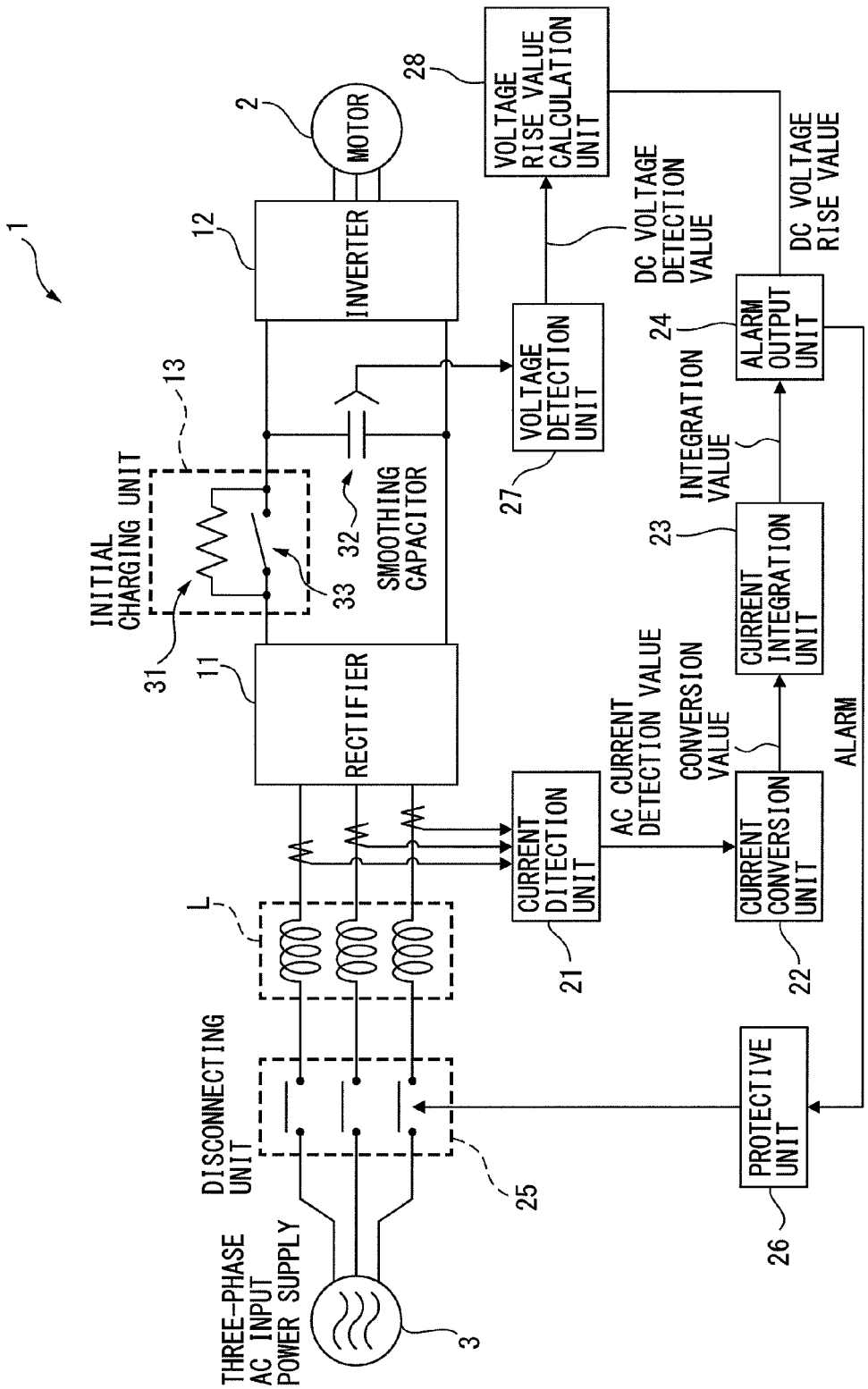
FIG. 4 is a principal block diagram of a motor control device according to a second embodiment.

FIG. 4 is a principal block diagram of a motor control device according to a second embodiment. In the second embodiment, a voltage detection unit 27 for detecting a DC voltage value applied to both ends of the smoothing capacitor 32 and outputting a DC voltage detection value and a voltage rise value calculation unit 28 for calculating a DC voltage rise value, which is an increment of a DC voltage detection value from the charging start of the smoothing capacitor 32 by the initial charging unit 13 are additionally provided in the motor control device 1 in the first embodiment of FIG. 1, and a second threshold value $Th_2$ is used as the determination condition for determining the presence or absence of the probability that the charging resistor 31 is fused, in addition to the first threshold value $Th_1$. In addition, since circuit elements other than the voltage rise value calculation unit 28 and the voltage detection unit 27 are similar to the circuit elements illustrated in FIG. 1, the same reference numerals are provided to the same circuit elements and a detailed description thereof will be omitted.

In the aforementioned first embodiment, in consideration of the case in which the first threshold value $Th_1$ is equal to the charge amount $Q_{SHT}$ [C] flowing into the smoothing capacitor 32 until the DC link is short-circuited and the charging resistor 31 is fused, when the capacity of the smoothing capacitor 32 installed in the motor control device 1 is in the range from $C_{MAX}/2$ to the maximum capacity $C_{MAX}$, even though there is no failure, the alarm output unit 24 outputs an alarm. Therefore, in the second embodiment, the magnitude of the DC voltage rise value, which is the increment of the DC voltage detection value from the charging start of the smoothing capacitor 32 by the initial charging unit 13, is compared with the magnitude of the second threshold value $Th_2$, so that the accuracy of detection of failure is improved.

In general, the DC voltage detection value of the smoothing capacitor 32 is used in the driving control of the motor 2 by the motor control device 1; however, the voltage detection unit 27 for detecting the DC voltage value is generally provided in the motor control device 1. In the second embodiment, the DC voltage detection value output by the voltage detection unit 27 is also sent to the voltage rise value calculation unit 28.

The voltage rise value calculation unit 28 calculates the DC voltage rise value, which is the increment of the DC voltage detection value from the charging start of the smoothing capacitor 32 by the initial charging unit 13.

The alarm output unit 24 determines whether the integration value received from the current integration unit 23 is equal to or more than the first threshold value $Th_1$, and determines whether the DC voltage rise value received from the voltage rise value calculation unit 28 is smaller than the second threshold value $Th_2$.

When the integration value is equal to or more than the first threshold value $Th_1$ and the DC voltage rise value is smaller than the second threshold value $Th_2$, the alarm output unit 24 outputs an alarm.

Hereinafter, the setting of the second threshold value $Th_2$ used in the alarm output process in the alarm output unit 24 will be described. In the case in which a charge amount equal to the first threshold value $Th_1$ set as described above is flown into the smoothing capacitor 32, the DC voltage rise value from the charging start of the smoothing capacitor 32 by the initial charging unit 13 becomes a minimum value $\Delta V_{DCMIN}$ [V] (hereinafter, simply referred to as a "minimum value of the DC voltage rise value") when the capacity of the smoothing capacitor 32 provided in the motor control device 1 is the maximum capacity $C_{MAX}$ [F]. That is, in this case, Equation 7 below is established.

$$Th_1 = C_{MAX} \cdot \Delta V_{DCMIN} \quad (7)$$

When Equation 7 above no longer holds, Equation 8 below is obtained.

$$\Delta V_{DCMIN} = \frac{Th_1}{C_{MAX}} \quad (8)$$

When there is a state in which no failure occurs, a DC voltage rise value calculated by the voltage rise value calculation unit does not become less than the minimum value $\Delta V_{DCMIN}$ [V]. In other words, when the DC voltage rise value calculated by the voltage rise value calculation unit is further small, it can be said that any failure occurs. Accordingly, in the second embodiment, as expressed by Equation 9 below, the second threshold value $Th_2$ is set as a value smaller than the minimum value $\Delta V_{DCNIN}$ [V] of the DC voltage rise value when a charge amount equal to the first threshold value $Th_1$ has been flown into the smoothing capacitor 32. As described above, since "the amount of charge flown into the smoothing capacitor 32 by passing through the charging resistor 31" is equivalent to the value calculated as the "integration value" by the current integration unit 23, it can be said that "the case in which the charge amount equal to the first threshold value $Th_1$ has been flown into the smoothing capacitor 32" has the same meaning as "the case in which the integration value calculated by the current integration unit 23 has reached the first threshold value $Th_1$". Accordingly, the definition of the second threshold value $Th_2$ can be said as a "value set to be smaller than the minimum value of the DC voltage rise value when the integration value calculated by the current integration unit 23 has reached the first threshold value $Th_1$".

$$Th_2 = \Delta V_{DCMIN} = \frac{Th_1}{C_{MAX}} < \frac{V_{MAX}}{2} \quad (9)$$

In the second embodiment, the first threshold value $Th_1$ and the second threshold value $Th_2$ are used as the determination condition for determining the presence or absence of the probability that the charging resistor 31 is fused, so that the presence or absence of the probability that the charging resistor is fused is determined with high accuracy. When it is determined that the aforementioned integration value is equal to or more than the first threshold value $Th_1$ and the DC voltage rise value is smaller than the second threshold value $Th_2$, the alarm output unit 24 outputs an alarm because it is highly probable the charging resistor 31 is fused, and otherwise, the alarm output unit 24 outputs no alarm. According to the second embodiment, since it is possible to more accurately detect the probability that the charging resistor is fused, the protective unit can output a disconnecting command of the supply of AC power to the disconnecting unit regardless of the factor such as excess in the capacity of the smoothing capacitor 32 and short-circuit of the DC link by failure of the switching element and the like of the rectifier 11 or the inverter 12, so that it is possible to more reliably prevent a DC current equal to or more than the instantaneous load tolerance from flowing through the charging resistor.

Figure 5:
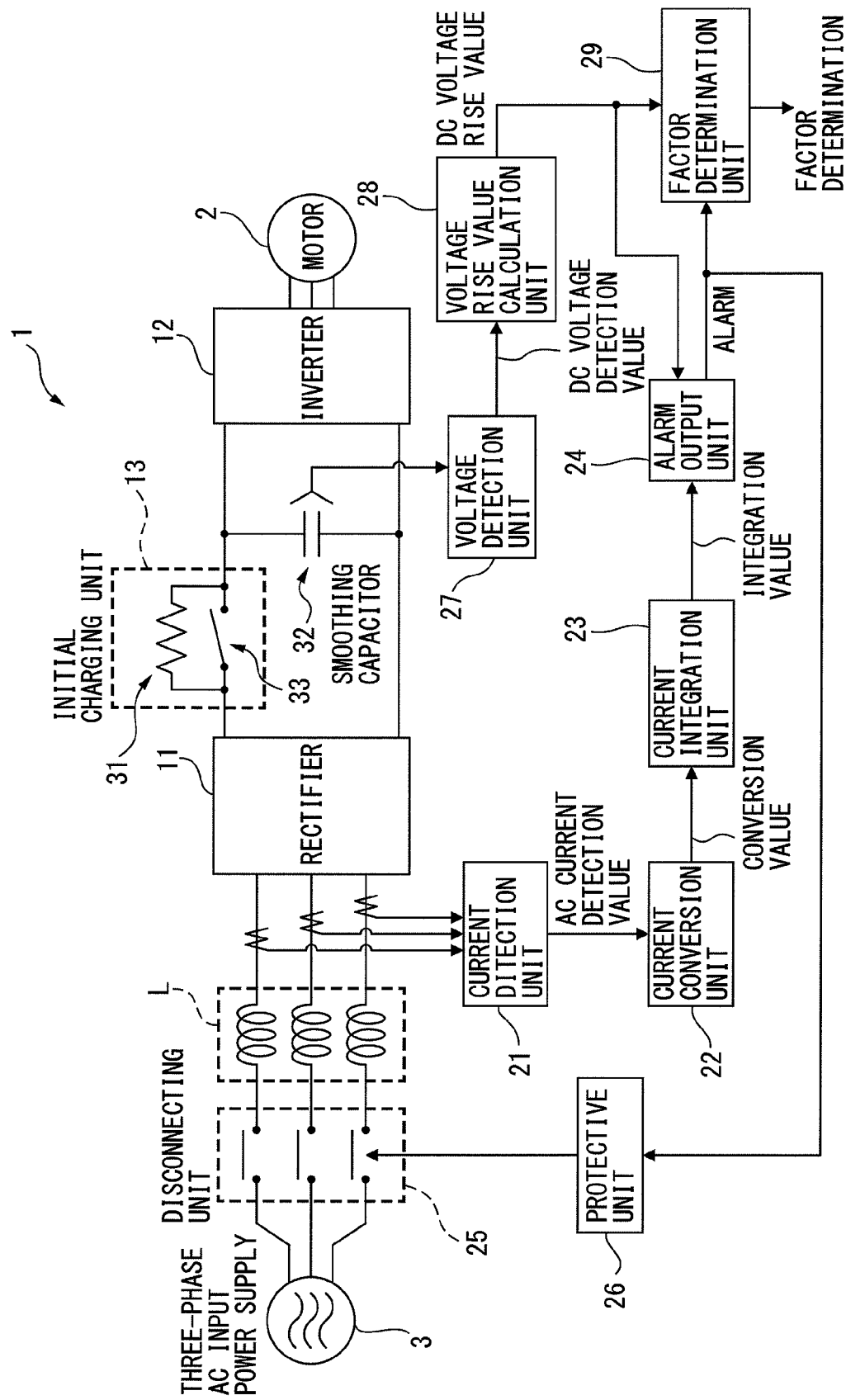
FIG. 5 is a principal block diagram of a motor control device according to a third embodiment.

FIG. 5 is a principal block diagram of a motor control device according to a third embodiment. In the third embodiment, a factor determination unit 29 for determining the alarm generation factor is additionally provided in the motor control device 1 in the second embodiment illustrated in FIG. 4. In addition, since circuit elements other than the factor determination unit 29 are similar to the circuit elements illustrated in FIG. 4, the same reference numerals are provided to the same circuit elements and a detailed description thereof will be omitted.

The factor determination unit 29 determines the alarm generation factor of the initial charging unit 13 on the basis of the DC voltage rise value calculated by the voltage rise value calculation unit 28 and a third threshold value $Th_3$ when the alarm output unit 24 outputs an alarm. The third threshold value $Th_3$ is set as a value smaller than the second threshold value $Th_2$ in response to a detection error of the voltage detection unit 27.

Hereinafter, the third threshold value $Th_3$ used in the alarm generation factor determination process in the factor determination unit 29 will be described. In the case of short-circuit of the DC link by failure of the switching element and the like of the rectifier 11 or the inverter 12, the DC voltage rise value calculated by the voltage rise value calculation unit 28 is ideally 0. However, actually, the DC voltage rise value is not 0 due to the DC voltage detection error of the voltage detection unit 27. Furthermore, since the alarm output unit 24 outputs an alarm in the case in which the integration value is equal to or more than the first threshold value $Th_1$ and the DC voltage rise value is smaller than the second threshold value $Th_2$, if the third threshold value $Th_3$ is set as a value larger than 0 and smaller than the second threshold value $Th_2$ as expressed by Equation 10 below, when the alarm is output because the integration value is equal to or more than the first threshold value $Th_1$ and the DC voltage rise value is smaller than the second threshold value $Th_2$, the factor determination unit 29 can determine whether the DC voltage rise value at this time is smaller than the third threshold value $Th_3$, thereby determining whether a failure factor is the short-circuit of the DC link.

$$0 < Th_3 < Th_2 = \Delta V_{DCMIN} = \frac{Th_1}{C_{MAX}} < \frac{V_{MAX}}{2} \qquad (10)$$

In the case in which the DC voltage rise value calculated by the voltage rise value calculation unit 28 is smaller than the third threshold value $Th_3$ when the alarm has been output, the factor determination unit 29 determines that the alarm generation factor is the short-circuit of the DC link, and in the case in which the DC voltage rise value is equal to or more than the third threshold value $Th_3$, the factor determination unit 29 determines that the alarm generation factor is excess in the capacity of the smoothing capacitor provided to the DC link. The determination result by the factor determination unit 29, for example, may be displayed on a display (not illustrated) provided in the motor control device 1 or may be stored in a storage unit (not illustrated). In this way, since a designer or a worker can recognize the alarm generation factor, it is easy to maintain and design changes in the motor control device 1. For example, when a worker has recognized that the alarm generation factor is the short-circuit of the DC link from the factor determination unit 29, the worker can immediately take measures such as exchange or repair of the switching element of the rectifier 11 or the inverter 12 which has caused the failure. For example, when a worker has recognized that the alarm generation factor is the excess in the capacity of the smoothing capacitor 32 from the factor determination unit 29, the worker can immediately exchange to a smoothing capacitor 32 having a smaller capacity.

Figure 6:
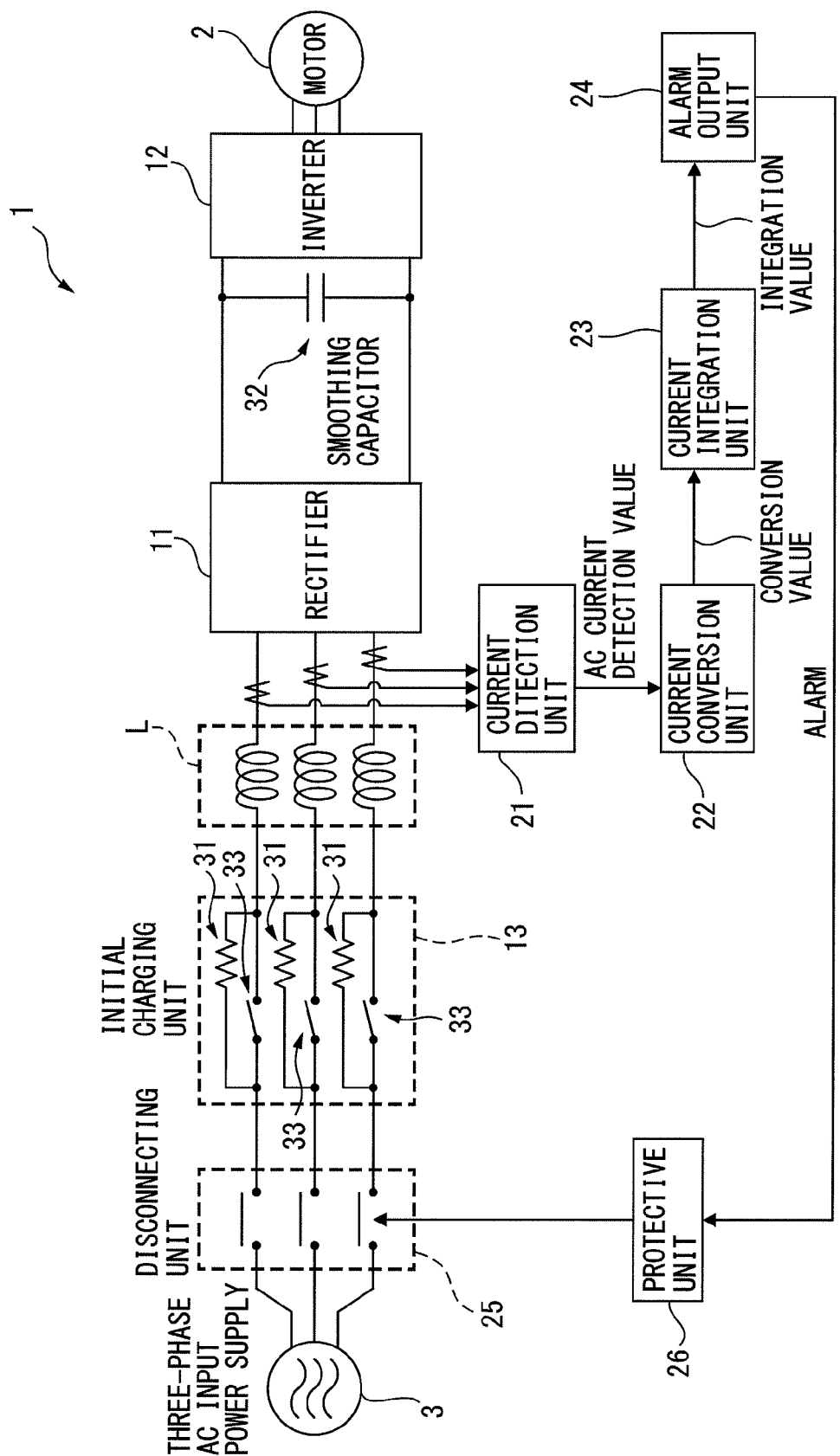
FIG. 6 is a principal block diagram of a motor control device in which an initial charging unit is provided to a three-phase AC input side of a rectifier.
Figure 7:
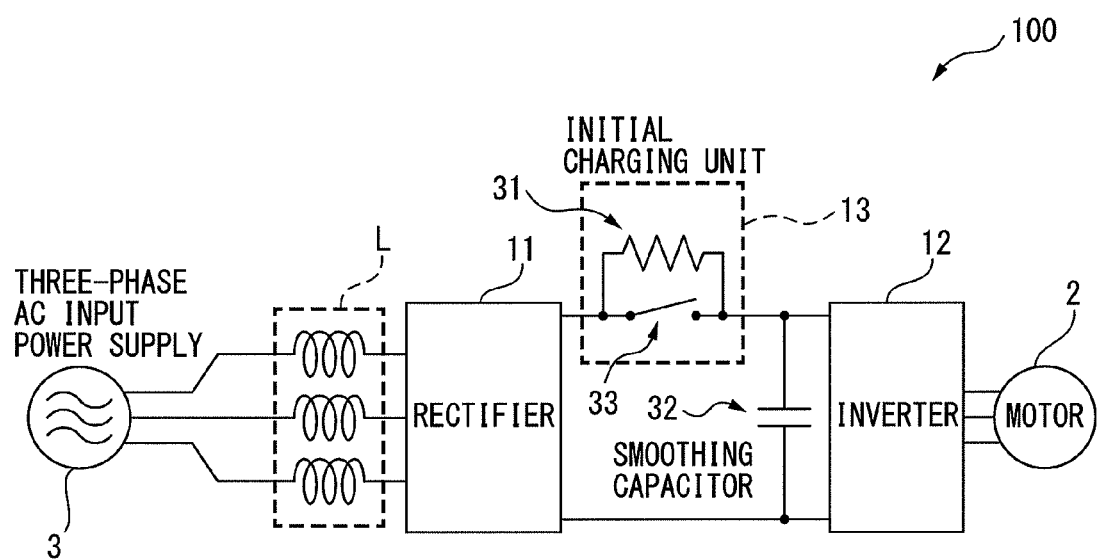
FIG. 7 is a diagram illustrating the configuration of a general motor control device.

In the aforementioned each embodiment, the initial charging unit 13 is provided between the rectifier 11 and the smoothing capacitor 32. However, alternatively, even though the initial charging unit 13 is provided to the three-phase AC input side of the rectifier 11, the present invention can be realized. FIG. 6 is a principal block diagram of the motor control device in which the initial charging unit is provided to the three-phase AC input side of the rectifier. In the example illustrated in FIG. 6, a description will be provided for the case in which the initial charging unit 13 is provided between the AC reactor L, which is the three-phase AC input side of the rectifier 11, and the disconnecting unit 25 in the motor control device in the first embodiment described with reference to FIG. 1. However, this can also be applied to the second and third embodiments in a similar manner. In the initial charging unit 13, a group in which the charging resistor 31 and the switch unit 33 are connected in parallel to each other is provided to at least two phases of the three phases. In addition, in the illustrated example, the group is provided to all the three phases. During the initial charging period, the switch unit 33 is opened (turned off), and during the typical operation period in which the motor control device 1 drives the motor 2, the closed circuit state (a turn-on state) of the switch unit 33 is maintained. In more detail, the switch unit 33 is opened (turned off) during the initial charging period until the driving of the motor 2 is started immediately after the motor control device 1 starts to operate, so that an AC current from the three-phase AC input power supply 3 is input to the rectifier 11 through the charging resistor 31 and is rectified, a DC current output from the rectifier 11 flows into the smoothing capacitor 32, and thus the smoothing capacitor 32 is charged. When the smoothing capacitor 32 is charged up to a predetermined voltage, the switch unit 33 is closed (turned on), so that the initial charging operation is completed. Thereafter, the inverter 12 starts a power conversion operation to supply the motor 2 with driving power, so that the motor 2 is driven on the basis of the driving power. In addition, since circuit elements other than the above are similar to the circuit elements in the aforementioned each embodiment, the same reference numerals are provided to the same circuit elements and a detailed description thereof will be omitted.

In addition, the current conversion unit 22, the current integration unit 23, the alarm output unit 24, the protective unit 26, and the factor determination unit 29 described in the aforementioned each embodiment, for example, may be constructed in the form of a software program, or may also be constructed by a combination of various electronic circuits and a software program. For example, when these units are constructed in the form of a software program, the calculation processing device in the motor control device 1 operates according to the software program, so that the functions of the aforementioned each unit are performed. Furthermore, a software program related to these units in an existing motor control device is additionally installed in a calculation processing device in the motor control device, so that the present invention can also be applied.

According to the present invention, it is possible to realize the motor control device capable of reliably protecting the initial charging unit 13 used in the initial charging of the smoothing capacitor provided to the DC link.

According to the first embodiment, since the first threshold value is set as a value lower than the "charge amount by which the charging resistor is fused by the amount of charge flowing through the charging resistor", and the presence or absence of the probability that the charging resistor is fused is determined by comparing the first threshold value with a value obtained by performing a predetermined calculation process for the AC current detection value of the three-phase AC input side of the rectifier, the protective unit can output a disconnecting command of the supply of AC power to the disconnecting unit regardless of the factor such as excess in the capacity of the smoothing capacitor 32, and short-circuit of the DC link by failure of the switching element and the like of the rectifier 11 or the inverter 12, so that it is possible to prevent a DC current equal to or more than the instantaneous load tolerance from flowing through the charging resistor.

According to the second embodiment, since the second threshold value is used as the determination condition for determining the presence or absence of the probability that the charging resistor is fused, in addition to the first threshold value, the probability that the charging resistor is fused can be determined with high accuracy, so that it is possible to more reliably prevent a DC current equal to or more than the instantaneous load tolerance from flowing through the charging resistor.

According to the third embodiment, since it is possible to determine the alarm generation factor by using the third threshold value set as a value smaller than the second threshold value in response to the detection error of the voltage detection unit and the DC voltage rise value, which is an increment of the DC voltage detection value from the charging start of the smoothing capacitor 32, a designer or a worker can easily recognize the alarm generation factor, and therefore it is possible to maintain and design changes in the motor control device.

What is claimed is:

1. A motor control device comprising:
a rectifier that rectifies AC power supplied from an three-phase AC input side and outputs DC power;
a smoothing capacitor provided to a DC link which is a DC output side of the rectifier;
an inverter that mutually power-converts DC power in the DC link and AC power which is driving power or regenerative power of a motor;
an initial charging unit having a switch unit and a charging resistor connected in parallel to the switch unit, opening the switch unit before motor driving is started, and charging the smoothing capacitor with a DC current output from the rectifier via the charging resistor;
a current detection unit that detects an AC current value of the three-phase AC input side of the rectifier, and outputs an AC current detection value;
a current conversion unit that outputs a conversion value obtained by converting the AC current detection value into a value corresponding to a DC current in the DC link;
a current integration unit that outputs an integration value obtained by integrating the conversion value output from the current conversion unit during a charging period of the smoothing capacitor by the initial charging unit;
an alarm output unit that outputs an alarm when the integration value is equal to or more than a first threshold value;
a disconnecting unit that is able to disconnect supply of the AC power to the rectifier in response to a received command; and
a protective unit that commands the disconnecting unit to disconnect the supply of the AC power when the alarm is output.

2. The motor control device according to claim 1, wherein the first threshold value is set as a value smaller than a charge amount by which the charging resistor is fused by the amount of charge flowing through the charging resistor.

3. The motor control device according to claim 2, further comprising:
a voltage detection unit that detects a DC voltage value of the smoothing capacitor and outputs a DC voltage detection value; and
a voltage rise value calculation unit that calculates a DC voltage rise value which is an increment of the DC voltage detection value from charging start of the smoothing capacitor by the initial charging unit,
wherein, when the integration value is equal to or more than the first threshold value and the DC voltage rise value is smaller than a second threshold value, the alarm output unit outputs the alarm.

4. The motor control device according to claim 3, wherein the second threshold value is set as a value smaller than a minimum value of the DC voltage rise value when the integration value has reached the first threshold value.

5. The motor control device according to claim 4, further comprising:
a factor determination unit that determines an alarm generation factor of the initial charging unit based on the DC voltage rise value when the alarm has been output.

6. The motor control device according to claim 5, wherein, in a case in which the DC voltage rise value when the alarm has been output is smaller than a third threshold value, the factor determination unit determines that the alarm generation factor is short-circuit of the DC link, and in a case in which the DC voltage rise value is equal to more than the third threshold value, the factor determination unit determines that the alarm generation factor is excess in a capacity of the smoothing capacitor provided to the DC link.

7. The motor control device according to claim 6, wherein the third threshold value is set as a value smaller than the second threshold value in response to a detection error of the voltage detection unit.

8. The motor control device according to claim 7, wherein the current conversion unit calculates, as the conversion value, a vector norm on a two-phase coordinate obtained by performing three-phase to two-phase conversion of the AC current detection value, or a peak current value of the AC current detection value.

* * * * *